(12) United States Patent
Veenhof (10) Patent No.: US 9,981,807 B2
(45) Date of Patent: May 29, 2018

(54) CONVEYOR BELT CLEANING DEVICE AND SYSTEM

(71) Applicant: Willem Veenhof, Brevard, NC (US)

(72) Inventor: Willem Veenhof, Brevard, NC (US)

(*) Notice: Subject to any disclaimer, the term of this patent is extended or adjusted under 35 U.S.C. 154(b) by 0 days. days.

(21) Appl. No.: 15/119,927

(22) PCT Filed: Mar. 2, 2015

(86) PCT No.: PCT/US2015/018228
§ 371 (c)(1),
(2) Date: Aug. 18, 2016

(87) PCT Pub. No.: WO2015/134348
PCT Pub. Date: Sep. 11, 2015

(65) Prior Publication Data
US 2017/0057752 A1 Mar. 2, 2017

Related U.S. Application Data

(60) Provisional application No. 61/947,162, filed on Mar. 3, 2014.

(51) Int. Cl.
*B65G 45/00* (2006.01)
*B65G 45/16* (2006.01)
*B65G 45/10* (2006.01)

(52) U.S. Cl.
CPC .................................. *B65G 45/16* (2013.01)

(58) Field of Classification Search
None
See application file for complete search history.

(56) References Cited

U.S. PATENT DOCUMENTS

| | | | | |
|---|---|---|---|---|
| 1,555,721 A * | 9/1925 | Thomas | ............... | G03B 27/06 355/102 |
| 4,189,046 A * | 2/1980 | Ward | ............... | B65G 45/16 15/256.5 |
| 6,517,060 B1 * | 2/2003 | Kemeny | ............... | F16F 1/32 267/136 |
| 6,748,994 B2 * | 6/2004 | Wien | ............... | B65C 9/0006 156/391 |

* cited by examiner

*Primary Examiner* — Kavel Singh
(74) *Attorney, Agent, or Firm* — Joseph T. Guy; Patent Filing Specialist, Inc.

(57) ABSTRACT

An improved conveyor belt cleaning device and system is described. The conveyor belt cleaning device comprises a frame below a conveyor belt. A leaf spring system is mounted on the frame. At least one arm is mounted on the leaf spring system and a scraper blade is mounted on the arm and arranged to engage with the conveyor belt to remove material from the conveyor belt. Another embodiment improves flexibility and strength of the device and system using a stepped or bellowed portion in the leaf springs.

11 Claims, 9 Drawing Sheets

Fig. 7 ial handling
CONVEYOR BELT CLEANING DEVICE AND SYSTEM

TECHNICAL FIELD

This invention relates to cleaning or scraping devices used for removing adhered cargo from a bulk material handling conveyor belt, after the material has passed the discharge point. Specifically, the scraping device invention provides sufficient structural flexibility and integrity to maintain proper conveyor belt contact in response to operational belt motions caused by direction changes and obstructions.

BACKGROUND

Conventional conveyor belt cleaning devices generally include one or more blades disposed in a plane transverse to the conveyor belt which are urged toward the belt so as to cause engagement of the blade, such as on an edge, with the belt surface. These devices generally are designed to allow the scraper blades to move in reaction to passing obstructions such as mechanical belt fasteners and damaged belt covers, as well as to the changing surface of the belt. This desired "range of motion" is often hampered by cargo material removed from the belt, but clinging to the cleaning device and its own support structure, which is commonly directly below the cleaning blades.

The clinging material negatively affects the efficiency of the cleaning device in various ways. The impact of the oncoming cargo on the blades reduces the effective pressure of the blade to the belt. Also, the weight of the clinging material is a negative to the required cleaning pressure. If this negative load is compensated for by increasing the operating pressure of the device, then the device will experience excessive pressure when the adhering build-up either falls away, or is washed away by increased moisture on the belt, or by clean-up operations. Further problems arise when adhering materials can set hard due to being left on an inoperative device overnight, or during any lengthy shutdown of the system.

Another problem encountered by many such devices, is that when a wear resistant blade, such as tungsten carbide, is struck by a fast moving obstruction such as mechanical belt fasteners or damaged belt covers, the blade is deflected back and away from the belt surface. The scraping device is designed to return the blade to engagement with the belt. This re-engagement can cause cutting of the belt cover, due to the amplified return force of the blade.

In spite of their long term use there is still an ongoing desire for improved conveyor belt cleaning devices. Improvements in a conveyor belt cleaners are provided herein.

SUMMARY

An object of the invention is to provide sufficient flexibility in the device to avoid reaching the yield strength of the material. Various types of deflections occur during operations including axial, lateral, angular, torsional, cyclic, or any combination that can occur at the same time to cause failure.

Another object of this invention is to provide a conveyor belt scraping device where the critical active components of the mechanism are prevented from being adversely affected by material build-up, and to minimize the impact of the oncoming cargo.

Another object of the invention is to reduce the risk of damage to the belt surface caused by the re-strike of the blade's cleaning edge, after being struck and deflected by an obstruction such as a mechanical fastener, or damaged belt cover.

A particular feature of the invention is the ability of the scraper blade to re-engage with the conveyor belt, after disengagement, in an orientation for minimizing damage or catastrophic failure of the device. These and other advantages, as will be realized, are provided in a conveyor belt cleaning device and system comprising a frame below a conveyor belt, a leaf spring system removably mounted on the frame, at least one scraper arm removably mounted on the leaf spring system, and a scraper blade removably mounted on the scraper arm and arranged to engage with the conveyor belt to remove material from the conveyor belt. In one embodiment, the leaf spring system further comprises at least one bend formed in a bellowed or stepped profile to provide sufficient flexibility during deflection of the device.

Yet another embodiment is provided in a method for cleaning a conveyor belt of adhered material using a conveyor with a first direction of travel and a second direction of travel opposite the first direction of travel. The conveyor has a conveyor belt cleaning system having a frame below a conveyor belt, a leaf spring system removably mounted on the frame, at least one arm removably mounted on the leaf spring system, and a scraper blade removably mounted on the arm wherein the scraper blade has a scraping edge. The method includes moving the conveyor cleaning system towards the conveyor belt until the scraping edge of the scraper blade contacts the conveyor preferably while the conveyor moves in the first direction.

Yet another embodiment is provide in a conveyor belt cleaning system comprising a frame disposed below a conveyor belt. A leaf spring system is removably mounted on the frame wherein the leaf spring system comprises multiple leaf springs. At least one leaf spring is a blade bearing leaf spring comprising a scraper arm removably mounted thereon. A scraper blade is removably mounted on the scraper arm and arranged to engage with the conveyor belt to remove material from the conveyor belt.

Yet another embodiment is provided in a method for cleaning a conveyor belt of adhered material. The method includes:
providing a conveyor comprising a conveyor belt with a first direction of travel and a second direction of travel opposite to the first direction of travel;
providing a conveyor belt cleaning system comprising:
a frame disposed adjacent the conveyor belt;
a leaf spring system removably mounted to the frame wherein the leaf spring system comprises multiple leaf springs;
at least one leaf spring of the leaf springs is a blade bearing leaf spring with at least one arm mounted thereto; and
a scraper blade mounted to the arm;
moving the conveyor cleaning system towards the conveyor belt until the scraper blade contacts the conveyor plus additional adjustment to provide deflection of the leaf spring system which provides stored range of motion to allow the blade to automatically compensate for abrasive wear without significant altering of the blade angle or contact pressure.

Yet another embodiment is provided in a conveyor belt cleaning system. The system includes a frame disposed below a conveyor belt. A leaf spring system is removably mounted to the frame wherein the leaf spring system comprises multiple leaf springs in a sandwiched relationship. At least one leaf spring is a blade bearing leaf spring comprising a scraper arm removably mounted thereon. At least one leaf spring comprises a bellowed profile portion wherein the blade bearing leaf spring is disposed atop the bellowed profile portion thereby forming a deviation between the blade bearing leaf spring and the bellowed leaf spring. A scraper blade is removably mounted on the scraper arm and arranged to engage with the conveyor belt to remove material from the conveyor belt.

DESCRIPTION

The present invention is directed to a conveyor belt cleaning assembly including at least one generally transversely extending cleaning device, engaging, in an operative position, a conveyor belt surface to be scraped clean of adhering cargo. The cleaning device includes a plurality of wear resistant scraper blades, each supported by a complex leaf spring suspension system, to resiliently bias the scraper blades in frictional engagement with the surface of the conveyor belt.

Conveyor belt scrapers are notoriously high maintenance equipment. They are by their very function, difficult to observe and to access, and they are often caked in mud the moment they begin to operate.

Another ongoing problem is that when an obstruction on the moving belt surface strikes the scraper blade, the blade separates from the belt surface and springs back with amplified force which can cause damage to the belt.

The invention will be described with reference to the figures forming an integral, non-limiting, component of the disclosure. The figures are intended to facilitate an understanding of the invention and are not intended to limit the invention in any way. Throughout the figures various elements will be numbered accordingly.

In the operation of bulk material belt conveyors, a scraper assembly is provided for removing adhering cargo material from the load surface of a conveyor belt and depositing it into a discharge area. In the absence of an efficient cleaning system, carry-over will be accumulated on the conveyor belt, leading to expensive and often difficult clean-up operations, and may build up sufficiently to interfere with operation of the conveyor.

The invention will be described with reference to the various figures provided to describe the invention without limit thereto. Throughout the various figures similar elements will be numbered accordingly.

Figure 1:
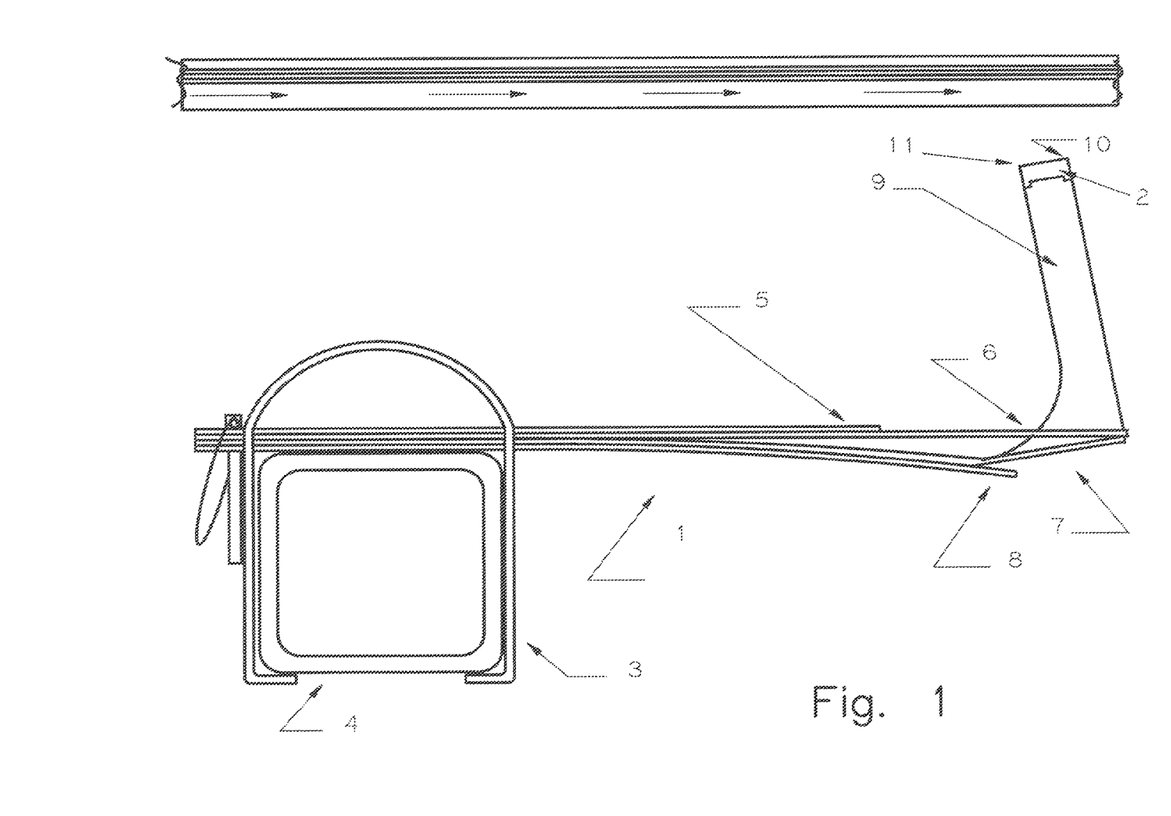
FIG. 1 is a side schematic view of an embodiment of the invention.
Figure 2:
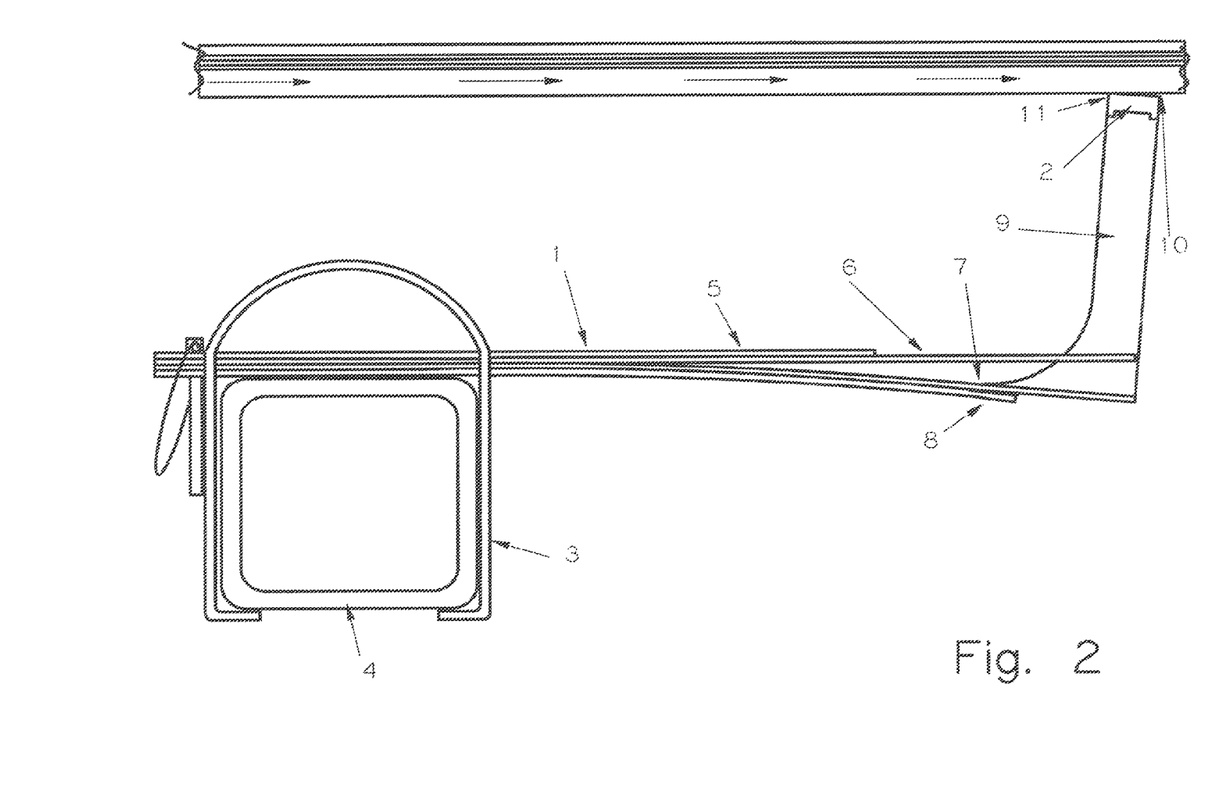
FIG. 2 is a side schematic view of an embodiment of the invention.
Figure 3:
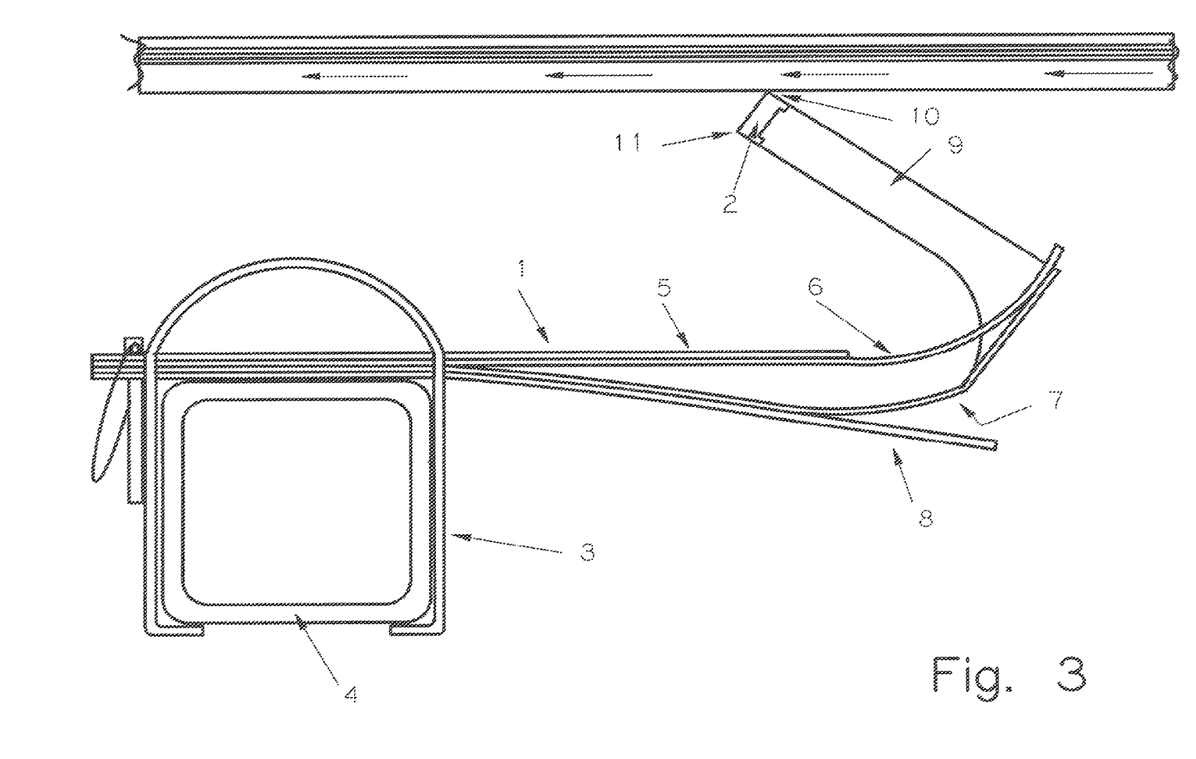
FIG. 3 is a side schematic view of an embodiment of the invention

An embodiment of the invention is illustrated in schematic side view in FIG. 1 prior to engagement of the scraper blade with the conveyor. An embodiment of the invention is illustrated in FIG. 2 with the scraper blade engaged as in normal operating in a cleaning or scraping mode. An embodiment of the invention is illustrated in FIG. 3 as would occur during a belt direction reversal, either purposeful or inadvertent.

Described herein are belt cleaning devices comprising a leaf spring system and a scraper blade attached to the leaf spring system. The wiper blade is preferably a wear resistant material and more preferably tungsten carbide.

In one embodiment, the leaf spring system, 1, preferably comprises multiple leaf springs in sandwich relationship mounted in series on a frame, 3, which is in turn mounted on a mandrel, 4, designed to facilitate ease of maintenance.

The leaf spring system, 1, comprises multiple spring-steel strips preferably comprising at least one top leaf, 5, at least one return leaf spring, 6, a blade bearing leaf spring, 7, and at least one tensioning leaf spring, 8, with the function of each to follow.

The function of the top leaf, 5, which is preferably rigid, is to act as a trip or limiting point for the blade bearing leaf member, 7, in the event of the conveyor belt reversing direction as illustrated in FIG. 3. Due to the reversed direction, the overturning forces exerted on the scraper blade, 2, tend to pull the blade toward the belt and into the reversed direction. The rigid top leaf, 5, also carries the weight of material build-up, thereby leaving the other leaf members relatively unaffected.

The function of the return leaf spring, 6, is to act as a return spring to ensure the scraper blade returns to the correct orientation, as illustrated in FIG. 2, when the conveyor belt resumes the original direction. The return leaf spring, 6, also acts as a vibration dampener by affecting the freedom of the blade bearing leaf member, 7, which tends to be excited into vibration by the action of the moving conveyor belt.

Blade bearing leaf spring, 7, bears the arms, 9, with the scraper blade, 2, thereon. The blade bearing leaf spring may be bent as illustrated. It is preferably that, if the blade bearing leaf spring is bent, the bend be ±10° relative to a planar spring and that the bend be near the free end, causing the perpendicular arms, 9, to be canted forward, against the direction of conveyor belt travel, when not under tension. As the unit is tensioned to the belt, the arms, 9, are forced to rotate back, setting the scraper blade, 2, into the desired orientation to the belt surface. The advantage of this feature is that when the scraper blade, 2, is struck by an obstruction on the belt, such as a mechanical fastener, it rotates away from the surface, freeing the arms to adopt the non-tensioned forward leaning position as illustrated in FIG. 1. When the obstruction has passed, the spring action of the blade bearing leaf spring, 7, and tensioning leaf spring, 8, return the blade to engagement with the belt surface with potentially amplified force. Due to the forward leaning angle of the arms the blade first strikes the belt surface initially with its rear edge, 10, which is safer to the belt than the leading edge, 11, thereby resulting in a soft return strike. The blade now adopts the desired orientation for cleaning, as illustrated in FIG. 2, by being tensioned to the belt.

The tensioning leaf spring, 8, when under tension, persuades the blade towards the conveyor thereby providing additional tensioning thrust to the blade bearing leaf spring, 7. This is preferred, because the thickness of blade bearing leaf spring, 7, is preferably thin enough to allow the full arcing range of motion which the blade passes through, to relieve the forces applied when the belt reverses direction, without permanent distortion.

The belt may reverse direction purposefully, such as with a reversible conveyor having a reversible drive system, or inadvertently such as occurs by the normal forces in a conveyor belt system.

Blade bearing leaf spring, 7, when thin enough to perform the required arc, does not have sufficient thrust, in some embodiments, to apply the desired force to the belt surface for sufficient cleaning. Tension leaf spring, 8, persuades the scraper blade towards the conveyor belt and also mitigates the freedom of movement of the blade bearing leaf spring, 7, thereby reducing the probability of vibration.

Each blade is supported by at least one leaf spring system and, if one, the leaf spring system is preferably centered. It is more preferable to have at least two leaf spring systems preferably with one at each extremity of the blade. More leaf spring systems can be employed in some embodiments, however, it is preferable to limit the number of leaf spring systems thereby limiting the area available for build up of material cleaned from the conveyor belt. In a preferred embodiment, Multiple scraper blades may be used across a span of the conveyor belt with each scraper blade having a discrete leaf spring system. Alternatively, a single scraper blade may span the width of the conveyor belt.

The level of efficiency is dependent on the design of the scraper mechanism maintaining the scraping edge of the scraper blade in constant continuous contact with the surface of the conveyor belt while maintaining the desired contact pressure.

Under certain field conditions, the forces on the blade bearing leaf spring, 7, are sufficient to break the leaf spring. Cyclic deflections of the blade bearing leaf spring, 7, can exceed the yield strength of the spring material and fracture, typically at stress concentration points or bend points. Stresses on the leaf spring material can cause either a brittle fracture or a ductile fracture, depending on field conditions. To avoid these stresses, another embodiment of the invention is illustrated in FIG. 4-7.

Figure 4:
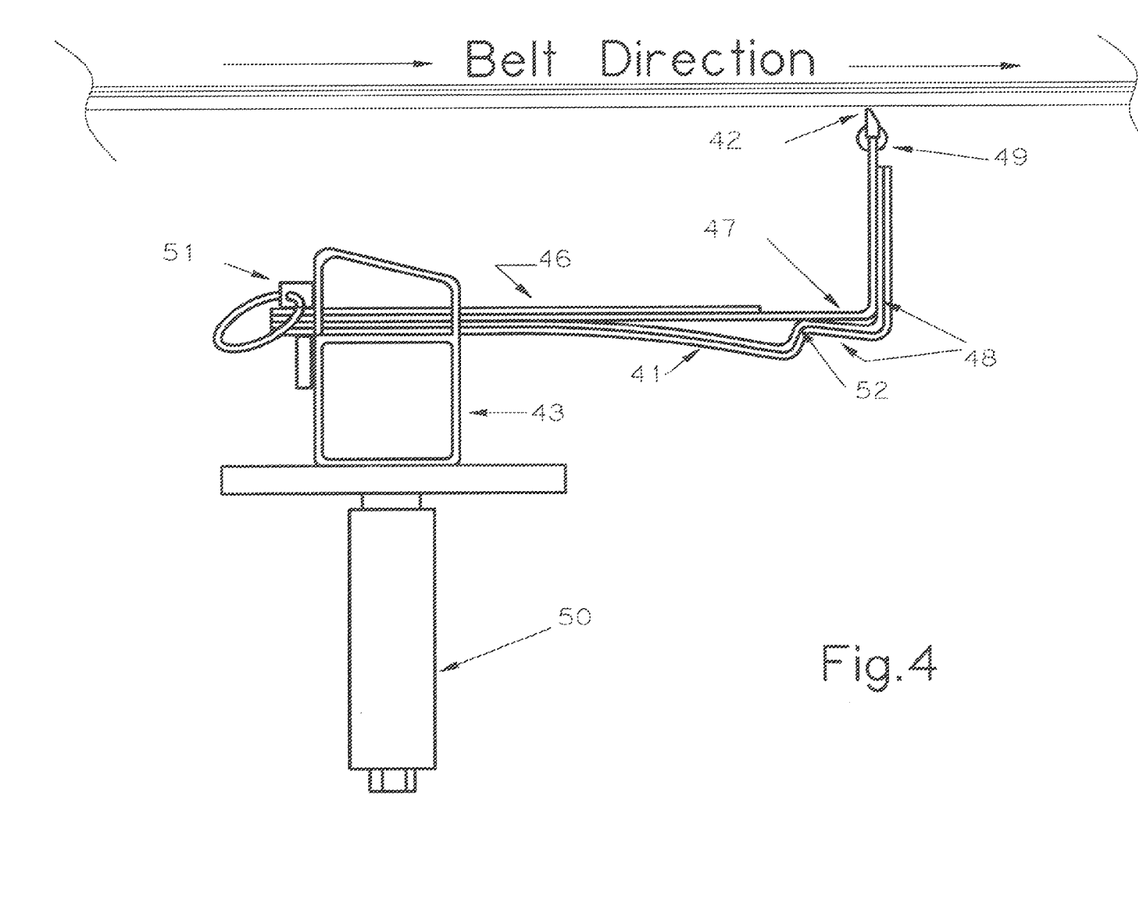
FIG. 4 is a side schematic view of an improved embodiment of the invention.

In FIG. 4, a holding frame, 43, is configured to removably retain a stepped or bellowed leaf spring system, 41, a blade bearing leaf spring, 47, and a return leaf spring, 46. The blade bearing leaf spring, 47, typically sits atop the bellowed tension spring system, 48, which provides additional flexibility in the system and minimizes stress concentration points. The bellowed tension spring system may include a single bellowed tension spring with multiple bellowed tension springs being more preferred. A combination of bellowed and straight springs can also be employed. In a particular embodiment the bellowed tension spring system comprises at least two bellowed tension springs to no more than five bellowed tension springs with two being preferred in some instances such as when bellowed tension springs with a high aspect ratio are employed. Each bellowed tension spring comprises a step, 52, which causes a separation between the uppermost bellowed tension spring, 48, and the blade bearing leaf spring, 47, with a deviation between the blades beginning at about, 53. The purpose of the separation will be further described below. A scraper blade, 42, is mounted in a blade retainer, 49, attached to the upper portion of the blade bearing leaf spring, 47. The scraper blade may be removably mounted, such as by mating structural components, or mounted by adhesives and the like which are essentially not removable since attempting to remove the scrape blade will likely cause damage thereto.

The scraper blade, 42, profile preferably narrows toward the top edge to minimize scraped material build-up surfaces. The shape of the scraper blade is not particularly limited herein. It is preferable that the scraper blade be rectangular or rectangular with one corner beveled. It is most preferable that the scraper blade, and other components, have minimal flat surfaces parallel to the belt since a flat surface parallel to the belt provides a surface upon which removed material can accumulate. The blade retainer, 49, profile preferably comprises rounded, or angled surfaces, facing the conveyor to avoid accumulation of scraped material. The blade retainer preferably has some flat surfaces to aid in the machining. While not limited thereto, a particularly suitable cross-sectional shape for demonstrating the invention is a polygon, particularly regular polygon, due to ready availability, with one face being approximately the width of the scraper blade such that when a slot is cut for receiving the scraper blade minimal surface area remains for material to accumulate. For these reasons a hexagonal blade retainer, with slots in opposing faces for receiving the scrape blade and blade bearing leaf spring, is particularly suitable for demonstration of the invention. A lift mechanism, 50, is preferable for moving the cleaning device towards, and away from, the conveyor belt for reversible engagement. The lift mechanism is not particularly limited herein with hydraulic, electrical-mechanical and mechanical being mentioned as representative lift mechanisms.

In a particularly preferred embodiment the stepped or bellowed leaf spring system, 41, is brought into engaging contact with the conveyor belt, as illustrated in FIG. 4, and then additional adjustment is provided wherein the stepped or bellowed leaf spring system, 41, is moved towards the conveyor belt thereby pre-tensioning the blade bearing leaf spring, 47. It is preferred that the pre-tensioning be less than the tension necessary to cause that portion of the blade bearing leaf spring which is substantially perpendicular to the conveyor belt to depart from a substantial perpendicular relationship with the conveyor belt. By pre-tensioning, as described, deflection of the leaf spring system provides a stored range of motion to allow the blade to automatically compensate for abrasive wear without significantly altering the blade angle or contact pressure.

The bellowed lead spring provides many advantages including an initial tensioning of the leaf springs thereby reducing the range of adjustment needed to provide optimum operating pressure. This reduced range of adjustment reduces the arc through which the blade moves on reversing the direction of the belt.

The layered arrangement of leaf springs, referred to herein as a leaf spring system, can be prepared wherein each leaf spring is attached to any adjacent leaf spring by a method such as welding, threaded members extending there through, or a securing collar around the assembly or combinations thereof. In one embodiment the leafs are separable, for cleaning or replacement for example, and held in engaging relationship by a member, 51, such as a hitch pin or threaded member extending through matching voids.

Figure 5:
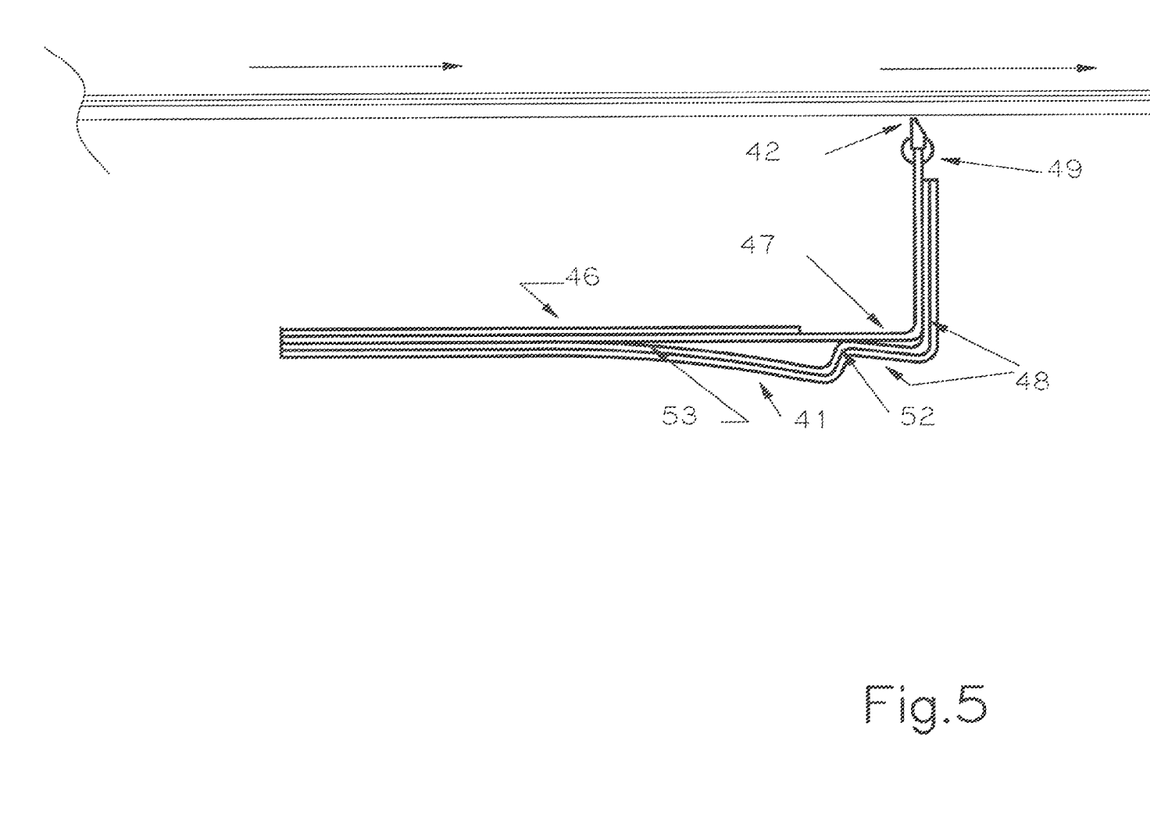
FIG. 5 is a side schematic view of the leaf spring portion of the improved embodiment.
Figure 6:
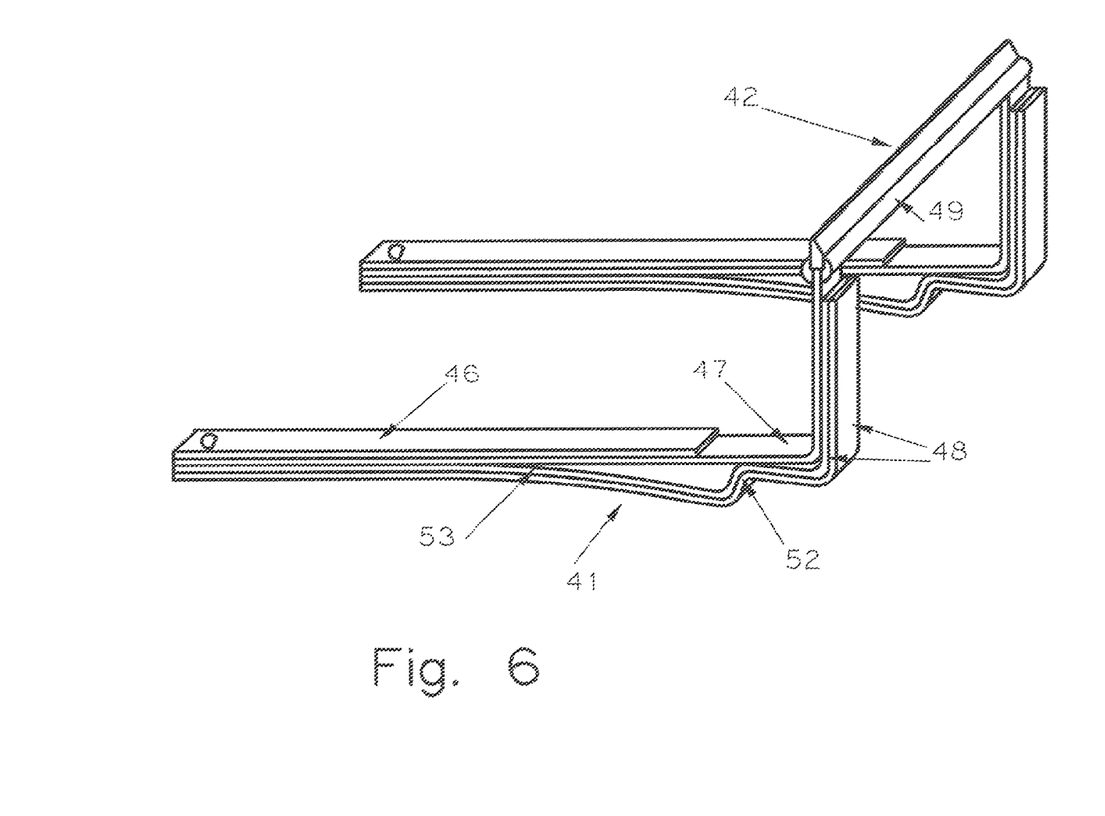
FIG. 6 is an isometric schematic view of the leaf spring portion of the improved embodiment.

FIG. 5 is an isolated side view of the leaf spring system in an embodiment in rest state. FIG. 6 is an isolated isometric view of an embodiment in rest state.

Figure 7:
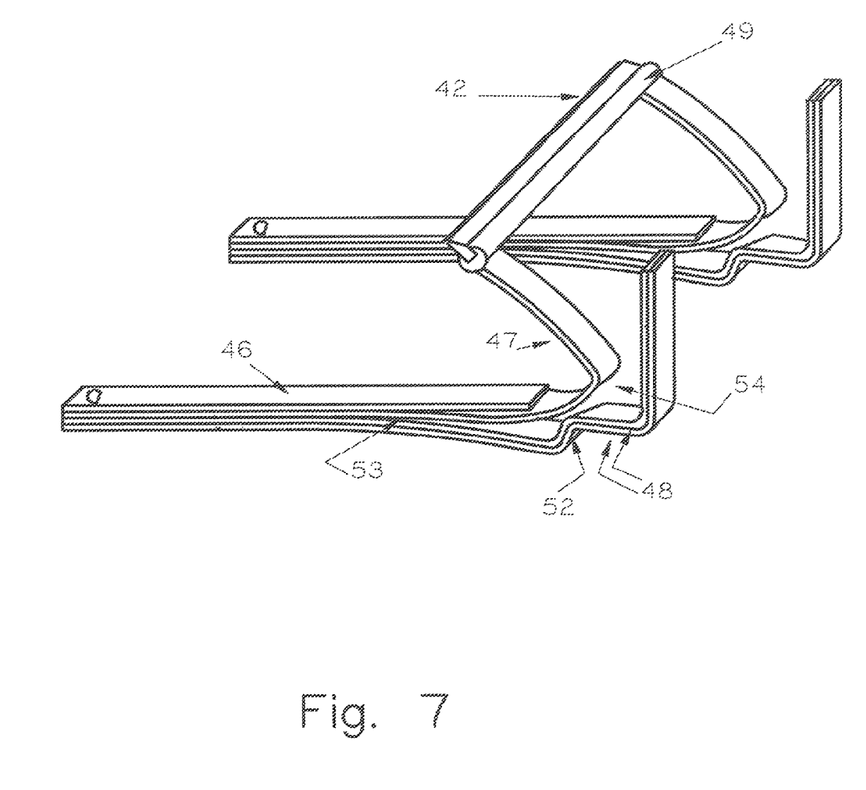
FIG. 7 is a flexed isometric of the leaf spring portion of the improved embodiment.

FIG. 7 shows flexure of the blade bearing leaf spring, 47, in response to reversal of the conveyor belt direction and illustrates an embodiment of the invention. As illustrated in FIG. 7, upon reversal of the conveyor belt, which is not shown in FIG. 7, the stress on the blade bearing leaf spring is distributed from about the location of deviation in the rest step, represented at about 53, to about the blade retainer, 49, thereby eliminating highly localized areas of stress. The equivalent radius of curvature caused by the stress, as measured from about the location of deviation to the upward bend, 54, in the blade bearing leaf spring can be adjusted by varying the length of the return leaf spring, 46, and the length of the location of the step bellowed tension spring between the end and the upward bend. The effective radius of the deflection can also be altered by the rigidity of the return leaf spring. The aspect ratio of the various springs is not typically limited herein. For the purposes of the present invention the aspect ratio is defined as the ratio of the width of the spring to the thickness of the spring. By way of example, a spring which is 1 inch wide and ⅛" thick has an aspect ratio of 8. The aspect ratio is determined based on the material used and the flex requirements for the application. An aspect ratio of 1 preferably has a square or round cross-section. For the purposes of the instant invention a low aspect ratio is defined as an aspect ratio of no more than 3 with an aspect ratio above 3 being referred to as a high aspect ratio. It is preferable that the blade bearing leaf spring, return leaf spring, top leaf and tensioning leaf spring have a high aspect ratio. The bellowed leaf spring can have a low aspect ratio.

Figures 8, 9:
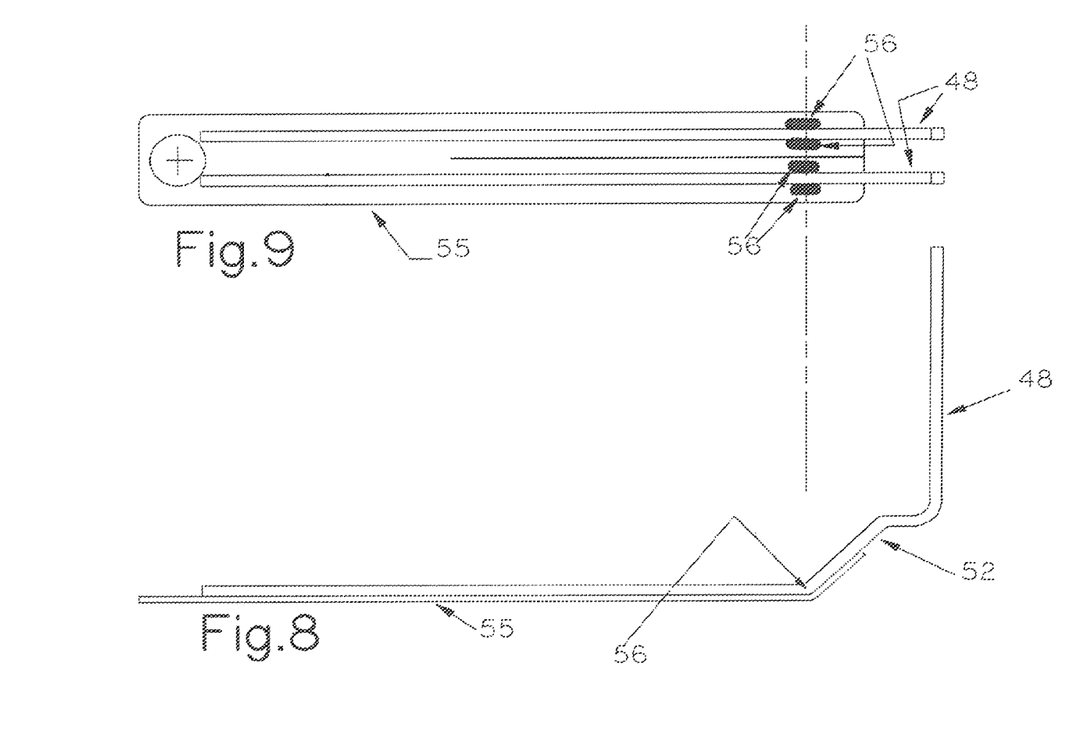
FIG. 8 is a side schematic view of a portion of an embodiment of the invention.
FIG. 9 is a top schematic view of a portion of an embodiment of the invention.
Figure 10:
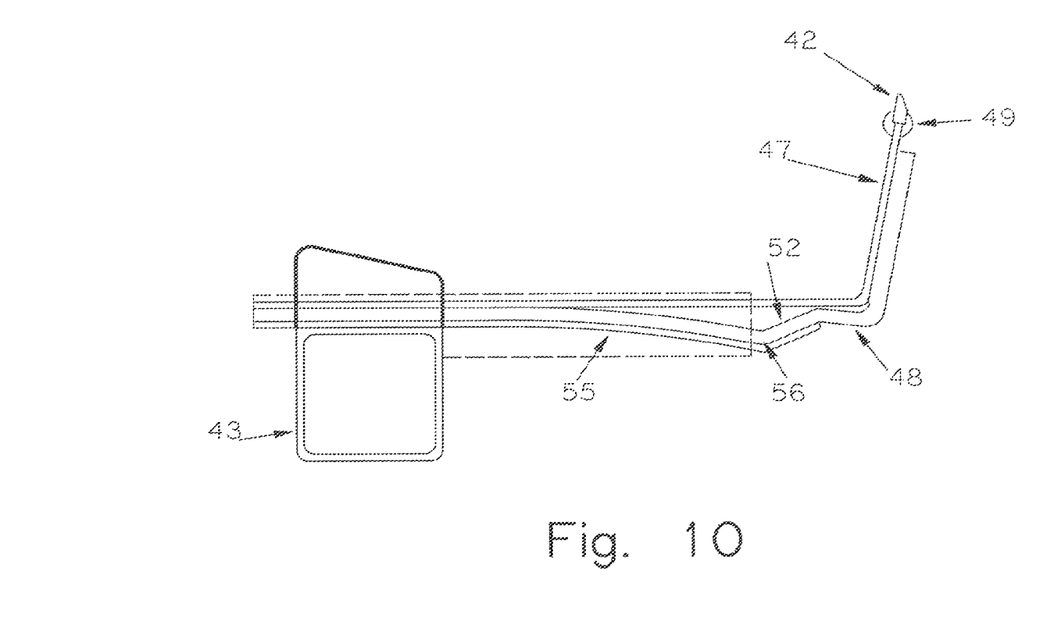
FIG. 10 is a side schematic view of an embodiment of the invention.

An embodiment is illustrated in FIGS. 8-10 wherein a bellowed tension spring, 48, has a low aspect ratio. For the purposes of illustration the bellowed tension spring of FIGS. 8-10 has an aspect ratio of about 1 and, for the purposes of demonstration of the invention a 3.4 mm (0.135 inch) square wire spring is suitable. As illustrated in FIG. 8, the low aspect ratio bellowed tension spring has a tensioning spring, 55, adjacent thereto. The low aspect ratio bellowed tension spring may be attached to the tensioning spring such as by a weld at about 56 to inhibit lateral and torsional movement of the low aspect ratio bellowed tension spring. The weld is preferably on either side of the tensioning spring as illustrated in FIG. 9. Other methods of inhibiting lateral and torsional motion can be employed such as a receiving groove in the tensioning spring or protrusions thereon. FIG. 9 also illustrates a common tensioning spring, 55, with a central slit, 60, which allows two cleaning devices to be side-by-side with a common mount.

Conveyor belt cleaning devices and systems are used in most tacky material handling and bulk loading applications where conveyor belt cargo is removably adhered to the belt surfaces. For example, fossil fuel based power plants use these systems on coal and ash handling conveyors. Most large industrial manufacturing operations rely on conveyor belts for product movement and these cleaning systems are necessary for safe and efficient material handling.

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A conveyor belt cleaning system comprising:
a frame disposed below a conveyor belt;
a leaf spring system removably mounted on said frame wherein said leaf spring system comprises multiple leaf springs in a sandwiched relationship;
at least one leaf spring of said multiple leaf springs is a blade bearing leaf spring comprising a scraper arm mounted thereon;
a scraper blade mounted on said scraper arm and arranged to engage with said conveyor belt to remove material from said conveyor belt;
wherein at least one leaf spring of said leaf springs comprises at least one bend thereby forming a bellowed profile portion; and
wherein said blade bearing leaf spring is disposed atop said bellowed profile portion thereby forming a deviation between said blade bearing leaf spring and said bellowed leaf spring.

2. The conveyor belt cleaning system of claim 1 wherein said blade bearing leaf spring is disposed atop said bellowed profile portion and further comprises at least one bend.

3. The conveyor belt cleaning system of claim 1 wherein at least one leaf spring of said leaf springs is a return leaf spring.

4. The conveyor belt cleaning system of claim 3 wherein at least one leaf spring of said leaf springs is a top leaf spring with said return leaf spring between said top spring and said blade bearing leaf spring.

5. The conveyor belt cleaning system of claim 4 wherein said top leaf spring is rigid.

6. The conveyor belt cleaning system of claim 1 wherein at least one leaf spring of said leaf springs is a tensioning spring.

7. The conveyor belt cleaning system of claim 1 wherein at least one leaf spring has an aspect ratio above 3.

8. The conveyor belt cleaning system of claim 1 wherein at least one leaf spring has an aspect ratio of no more than 3.

9. A conveyor belt cleaning system comprising:
a frame disposed below a conveyor belt;
a leaf spring system removably mounted on said frame wherein said leaf spring system comprises multiple leaf springs in a sandwiched relationship;
at least one leaf spring of said multiple leaf springs is a blade bearing leaf spring comprising a scraper arm mounted thereon;
at least one leaf spring of said leaf springs comprises a bellowed profile portion wherein said blade bearing leaf spring is disposed atop said bellowed profile portion thereby forming a deviation between said blade bearing leaf spring and said bellowed leaf spring; and
a scraper blade mounted on said scraper arm and arranged to engage with said conveyor belt to remove material from said conveyor belt.

10. The conveyor belt cleaning system of claim 9 wherein at least one leaf spring has an aspect ratio above 3.

11. The conveyor belt cleaning system of claim 9 wherein at least one leaf spring has an aspect ratio of no more than 3.

* * * * *